United States Patent
Satou et al.

(10) Patent No.: US 7,278,316 B2
(45) Date of Patent: Oct. 9, 2007

(54) ROUGH ROAD DRIVE SIMULATION AND EVALUATION FOR VEHICLE CONTROL SYSTEM

(75) Inventors: Osamu Satou, Kanagawa (JP); Syuuichi Nakagawa, Toyama (JP); Hiroshi Murakami, Kanagawa (JP); Haruki Saitou, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 189 days.

(21) Appl. No.: 11/137,789

(22) Filed: May 26, 2005

(65) Prior Publication Data

US 2005/0268708 A1  Dec. 8, 2005

(30) Foreign Application Priority Data

May 27, 2004  (JP)  ............................. 2004-158212

(51) Int. Cl.
*G01M 17/04* (2006.01)
(52) U.S. Cl. ...................................................... 73/669
(58) Field of Classification Search .................. 73/669, 73/670, 11.04, 121; 701/29, 36, 37
See application file for complete search history.

(56) References Cited

U.S. PATENT DOCUMENTS

| 4,186,593 | A | * | 2/1980 | Watanabe | ...................... 73/117 |
| 5,369,974 | A | * | 12/1994 | Tsymberov | ................. 73/11.08 |
| 5,432,700 | A | * | 7/1995 | Hrovat et al. | .................. 701/37 |
| 5,540,099 | A | * | 7/1996 | Harashima | ..................... 73/669 |
| 5,877,414 | A | * | 3/1999 | Rui et al. | ....................... 73/146 |
| 6,202,020 | B1 | * | 3/2001 | Kyrtsos | ........................ 701/80 |
| 2005/0085987 | A1 | * | 4/2005 | Yokota et al. | ................. 701/80 |
| 2005/0145034 | A1 | * | 7/2005 | Lenzen et al. | ................. 73/669 |
| 2006/0136111 | A1 | * | 6/2006 | Robert et al. | .................. 701/65 |

FOREIGN PATENT DOCUMENTS

| DE | 41 16 269 A1 | 11/1991 |
| WO | WO94/29814 A1 | 12/1994 |
| WO | WO 02/20319 A1 | 3/2002 |

OTHER PUBLICATIONS 2003.5 MSC.ADAMS Product Catalog, 5 pages.
U.S. Appl. No. 11/124,135, filed May 9, 2005, Katayama.

* cited by examiner

*Primary Examiner*—Eric S. McCall
(74) *Attorney, Agent, or Firm*—Foley & Lardner LLP

(57) ABSTRACT

A rough road drive simulation apparatus for testing a vehicle motion control system includes a real-time simulator. The real time simulator simulates a rough road driving state by entering, into a vehicle model representing a vehicle equipped with the vehicle motion control system, a wheel disturbance input based on a correlation between a road surface disturbance and a wheel rotation variation.

14 Claims, 9 Drawing Sheets

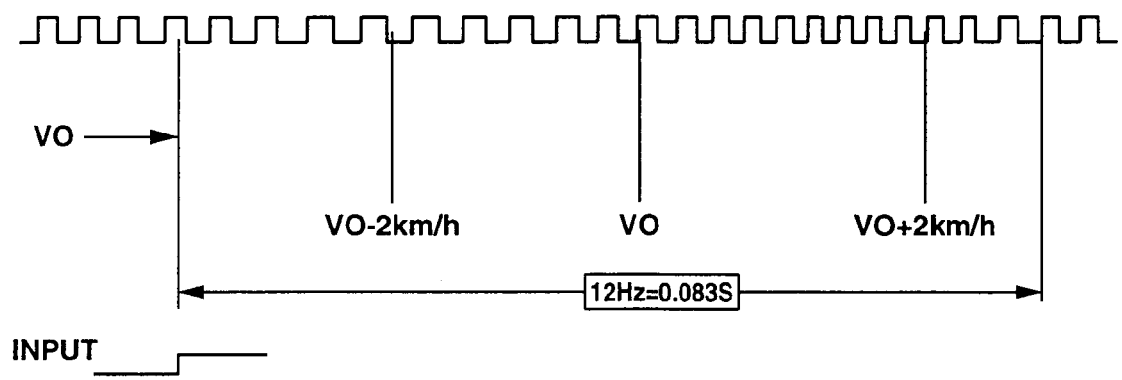
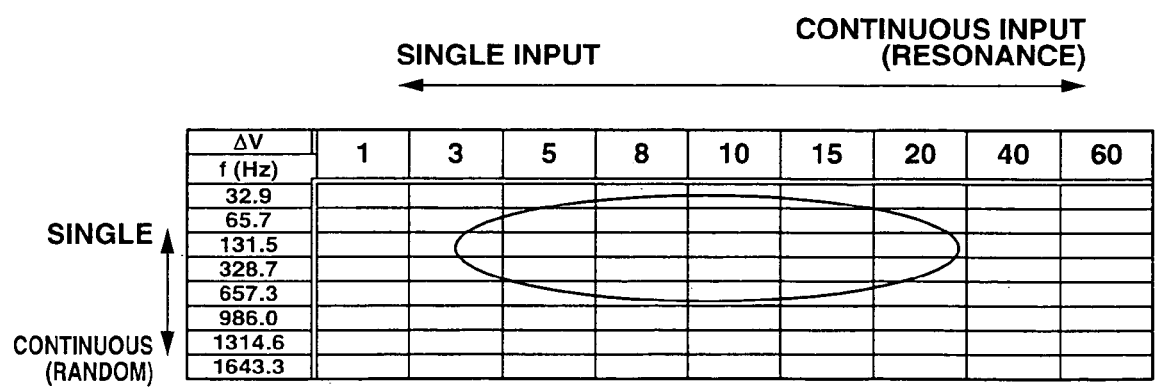

FIG.10
| INPUT FROM | ROAD SURFACE | FACTORS CAUSING WHEEL SPEED VARIATION |
|---|---|---|
| | | ROAD SURFACE FORM (SIDE VIEW) |
| (1) SINGLE INPUT | STEP MANHOLE DEPRESSION RUT | 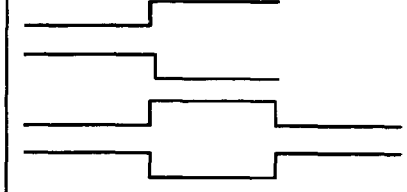 |
| (2) CONTINUOUS INPUT | IRREGULAR SURFACE CORRUGATED COBBLESTONE GRAVEL | 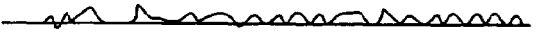 |
| (3) DISCONTINUOUS INPUT | IRREGULAR-SMOOTH |  |
FIG.11
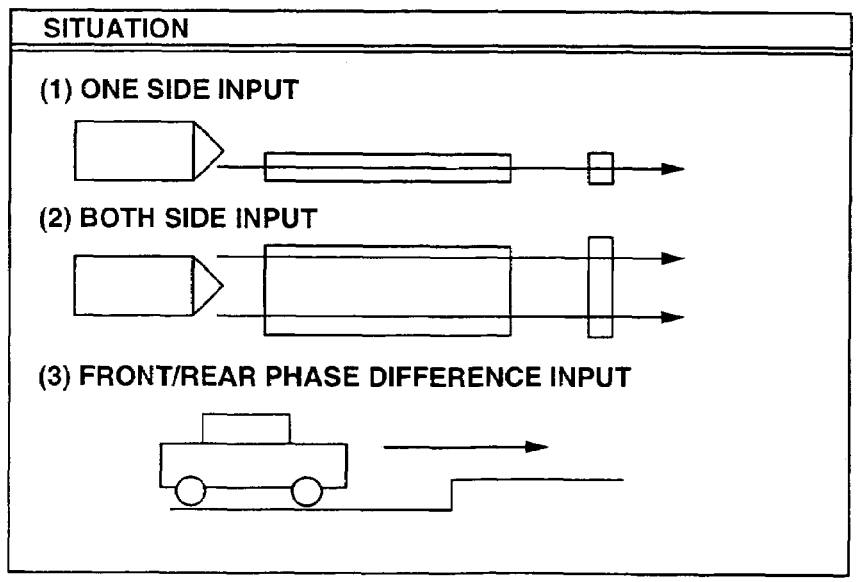
SITUATION
(1) ONE SIDE INPUT
(2) BOTH SIDE INPUT
(3) FRONT/REAR PHASE DIFFERENCE INPUT

ROUGH ROAD DRIVE SIMULATION AND EVALUATION FOR VEHICLE CONTROL SYSTEM

BACKGROUND OF THE INVENTION

The present invention relates to technique for testing a vehicle control system by simulation of rough road vehicle behavior and/or evaluating the performance of the vehicle control system.

Because of recent advance in electronics and society's growing demand for safer transportation and environmental protection, the technique of vehicle control systems is becoming more sophisticated and higher in performance level. Moreover, there is a demand for shorter development time to quicker production release. HILS (Hardware In the Loop Simulation) is a promising evaluation and verification tool for solution.

HILS is a tool for testing a real control system to be tested and evaluated (such as a vehicle control system under development) in a simulated virtual environment. In one simulation tool (software) as an example, simulation software for development of various control systems is added on to simulation software for structural analysis, and thereby influence exerted on a control system by phenomena such as vibration and deflection due to road surface displacement is evaluated and verified (as shown in a document "2003.5 MSC. ADAMS Product Catalog").

SUMMARY OF THE INVENTION

In the earlier simulating system constructed by downloading a virtual vehicle model build up in the form of software and simulation patterns, into a real-time simulator capable of real-time computation; connecting a real control unit (ECU) of a control system with the real-time simulator; entering the results of the computation based on the downloaded model and patterns, as input data to the real control unit (ECU); operating the real control unit on a time scale of actual vehicle running motion; and evaluating/analyzing the operation of the real control unit; there are involved difficulties in the following point.

The real-time simulator tends to be insufficient in computing speed to complete computation on a real-time scale (for example, computing with 1 ms for a phenomenon of 1 ms) when the size of a simulation model is increased by addition of a multitude of road environment models, into a vehicle model for the purpose of system evaluation of rough road driving performance. If, on the other hand, the vehicle model is simplified and the number of computation elements is decreased to enable computation of real-time simulation, the accuracy of simulation tends to become too poor for accurate evaluation and verification.

It is an object of the present invention to provide a system designed to ensure accurate simulation and real-time computation.

According to one aspect of the present invention, a rough road drive simulation apparatus for testing a vehicle motion control system, comprises: a real-time simulator configured to simulate a rough road driving state by entering, into a vehicle model representing a vehicle equipped with the vehicle motion control system, a wheel disturbance input based on a correlation between a road surface disturbance and a wheel rotation variation.

According to another aspect of the invention, a rough road drive simulation apparatus for testing a vehicle motion control system, comprises: a virtual test driving section adapted to be connected with the vehicle motion control system and configured to test a response of the vehicle motion control system in a simulated driving environment of a virtual vehicle model, by inputting a wheel speed signal into the vehicle control system in the virtual vehicle model, the virtual test driving section being further configured: to simulate a driving state of the virtual vehicle model on a rough road by inputting, into the vehicle motion control system, a noise-superimposed wheel speed signal obtained by superimposing a road disturbance noise to the wheel speed signal; to examine the response of the vehicle motion control system to the noise-superimposed wheel speed signal; and to adjust a sensitivity parameter of the vehicle motion control system so as to adjust a sensitivity of the vehicle motion control system toward a desired reference.

According to another aspect of the invention, a rough road drive simulation process for testing a vehicle motion control system, comprises: a first process element of setting the vehicle motion control system in a simulated virtual environment including a virtual vehicle model; a second process element of inputting a noise-superimposed wheel speed signal produced by superimposing a road disturbance noise signal to a wheel speed signal, into the vehicle motion control system in the simulated virtual environment; a third process element of examining a response of the vehicle motion control system to the noise-supposed wheel speed signal; and a fourth process element of adjusting a control parameter of the vehicle motion control system so as to adjust the response of the vehicle motion control system to a desired reference.

According to still another aspect of the invention, a rough road drive simulation apparatus for testing a vehicle motion control system, comprises: means for setting the vehicle motion control system in a simulated virtual environment including a virtual vehicle model; means for inputting a noise-superimposed wheel signal produced by superimposing a road disturbance noise signal to a wheel speed signal, into the vehicle motion control system in the simulated virtual environment; means for examining a response of the vehicle motion control system to the noise-supposed wheel speed signal; and means for adjusting a sensitivity of the vehicle motion control system so as to adjust the sensitivity of the vehicle motion control system to a desired reference value.

BRIEF DESCRIPTION OF THE DRAWINGS

FIG. 8 is a graph showing an example of a waveform of the road surface disturbance noise in the embodiment.

FIG. 9 is a view showing an input data map for simulating a rough road driving state, employed in the embodiment.

FIG. 10 is a view illustrating various forms of road surface disturbance input, used in the simulation system of FIG. 1.

FIG. 11 is a view illustrating various rough road driving situations, used in the simulation system of FIG. 1.

DETAILED DESCRIPTION OF THE INVENTION

Figure 1:
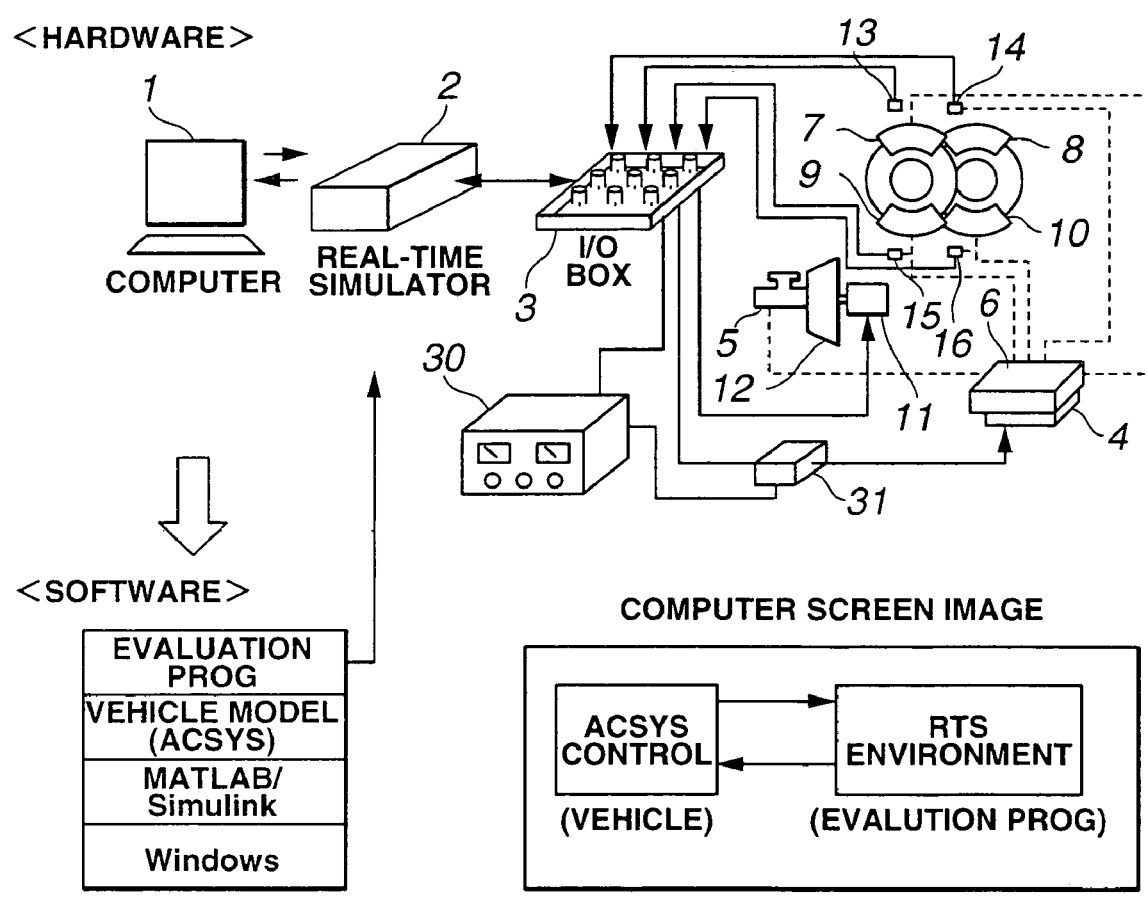
FIG. 1 is a schematic view showing a simulation system according to one embodiment of the present invention, for testing a vehicle motion control system.
Figure 2:
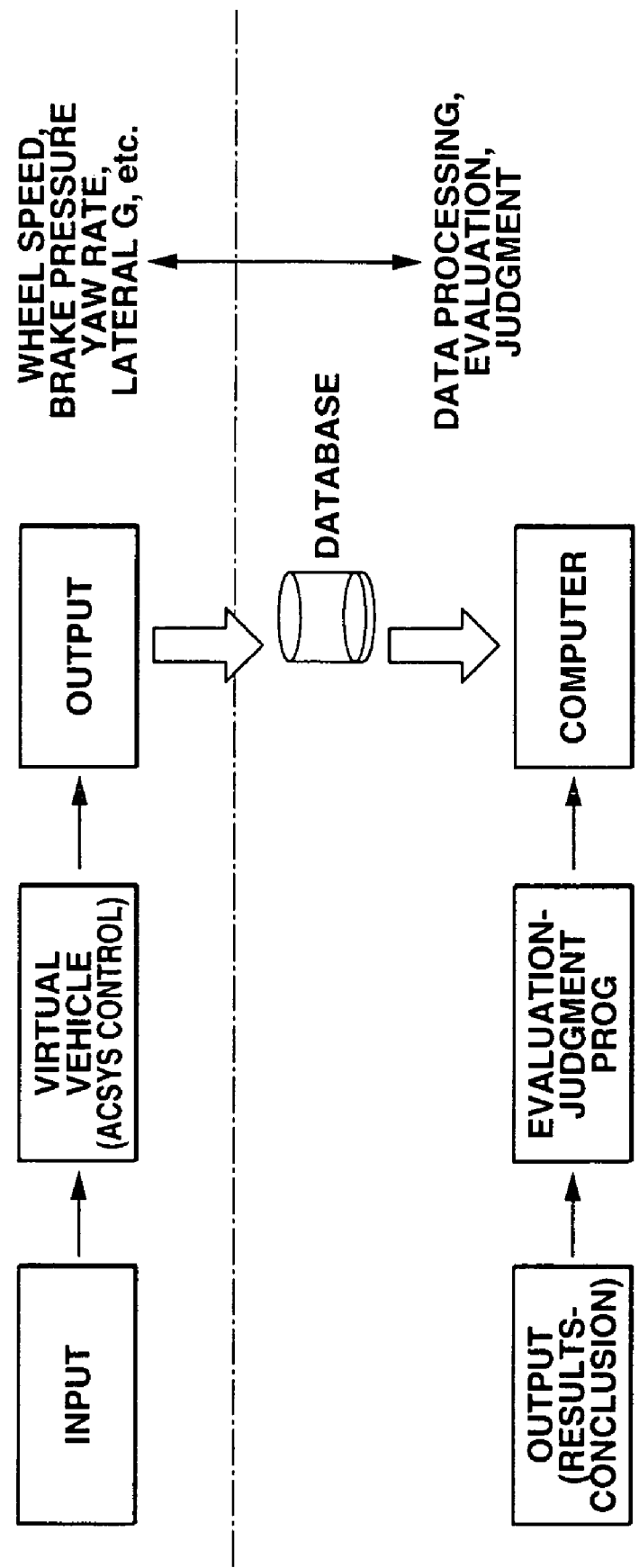
FIG. 2 is a view illustrating a flow of operations in the simulation system of FIG. 1.

FIG. 1 shows a simulation system or apparatus (or simulation and evaluation system) according to one embodiment of the present invention, for simulating vehicle performance for a vehicle control system on rough road, and evaluating the actuation sensitivity of the vehicle control system. FIG. 1 shows hardware and software structures of the entire system, and FIG. 2 shows a basic flow of evaluating operations performed in the simulation system.

In this embodiment, a vehicle motion control system (or vehicle dynamics control system) is a real system to be evaluated or tested. In the example shown in FIG. 1, the vehicle motion control system to be tested is a real VDC/TCS/ABS control system to be mounted in a real vehicle under development. Other vehicle components are in the form of models (forming a virtual vehicle model of a real vehicle to be tested). This simulation system executes real-time simulation (RTS) simulating the vehicle under development equipped with the VDC/TCS/ABS control system to be evaluated, and thereby evaluates the actuation sensitivity of the control system (such as ABS or TCS), by using vehicle wheel speeds as input information, in a rough road running state in the case that the VDC/TCS/ABS control system is equipped in the vehicle under development.

In the VDC/TCS/ABS control system, VDC stands for vehicle dynamics control system, TCS for traction control system, and ABS for anti-lock brake system.

As shown in FIG. 1, the rough road drive simulation system for the vehicle motion control system includes a personal computer 1 (serving as an estimator for evaluating system's actuation sensitivity), a real-time simulator 2, an input/output box 3, a VDC/TCS/ABS control unit 4, a master cylinder 5, a VDC/TCS/ABS actuator 6, a first wheel cylinder 7, a second wheel cylinder 8, a third wheel cylinder 9, a fourth wheel cylinder 10, a brake pedal effort generating device 11, a booster 12, a first wheel cylinder pressure sensor 13, a second wheel cylinder pressure sensor 14, a third wheel cylinder pressure sensor 15, a fourth wheel cylinder pressure sensor 16, a power supply 30, and a relay box 31.

Personal computer 1 is set up with software including an evaluation program, a virtual vehicle model (ACSYS), MATLAB/Simulink (registered trademark), and Windows (registered trademark).

Figure 12A:
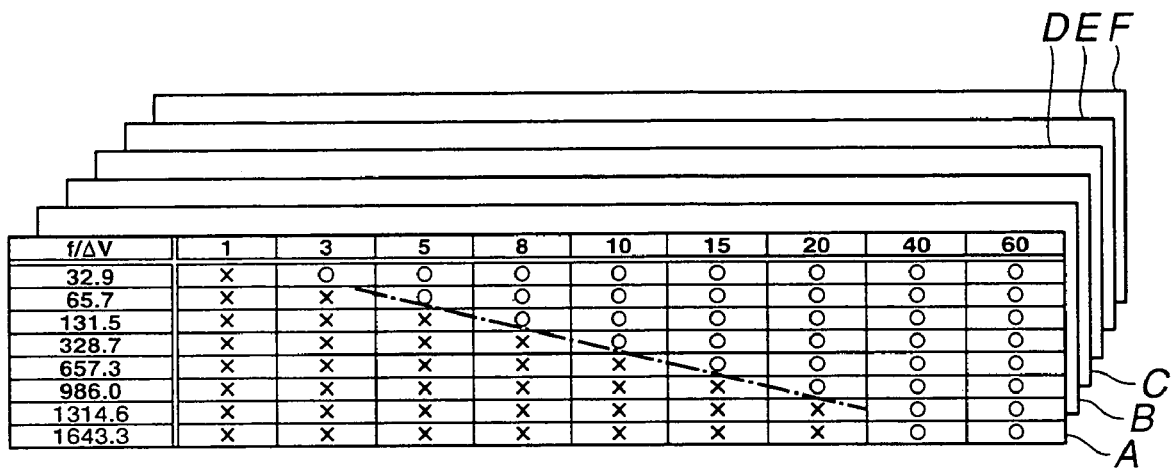
FIGS. 12A and 12B are views showing, as an example, simulation data map of a reference vehicle and simulation data map obtained by simulation of the simulation system of FIG. 1.
Figure 12B:
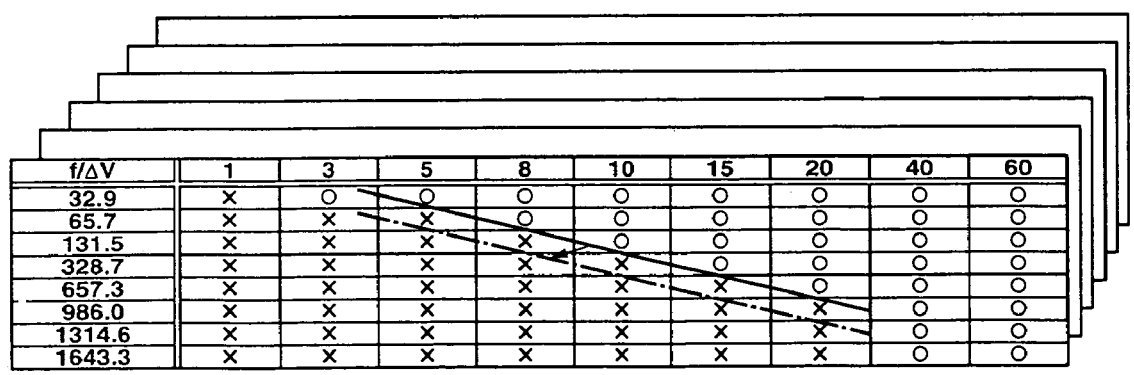

The evaluation program is a program to perform real-time simulation applying disturbance input to wheels based on correlation between road disturbance and wheel rotation fluctuation, into a virtual vehicle model simulating the vehicle under development, to reproduce a rough road running state; to accumulate a database by the execution of the real-time simulation; to draw a simulation data map (as shown in FIG. 12B) when a required amount of the database is accumulated; to check the consistency between a system actuation range as to a wheel speed variation width ΔV and a wheel speed variation rate f by the produced simulation data map and a system actuation range as to the wheel speed variable width ΔV and the wheel speed variation rate f by a predetermined reference map (as shown in FIG. 12A); to adjust a gain sensitivity and a frequency sensitivity to improve the consistency when the consistency is low; to repeat the operations of performing the simulation with the adjusted sensitivities until the consistency becomes high; and to make an evaluation that the operating sensitivity of the vehicle motion control system is proper when the consistency becomes high enough.

The virtual vehicle model is a vehicle model built by parameterization of part characteristics to be considered in the design process, to reproduce vehicle motion in real time. This virtual vehicle model is constructed, for example, by adding, to a vehicle model utilized for analytical evaluation of driving stability and ride comfort (having element models of suspension, steering and chassis), element models of engine, drive trains brake and tires for development of vehicle motion control system, and by entering required characteristic values to each element model. Each element model in the virtual vehicle model is selectable by switching. By selecting the element models, the virtual vehicle model is set, at the time of performing the real-time simulation, to desired forms (for vehicle models under development to be equipped with the VDC/TCS/ABS control system to be evaluated).

The MATLAB/Simulink is a general-purpose modeling program, and used for vehicle modeling and environment setting.

Real-time simulator 2 is configured to download the virtual vehicle model complied in the form for PPC in personal computer 1, and to perform simulation in real time at regular intervals of an interval time of 1 ms.

Input/output box 3 converts sensor signals (having values calculated by real-time simulator 2 according to the virtual vehicle model) representing wheel speeds, yaw rate, lateral acceleration and steer angle, into analog signals with a D/A board; or to input sensor signals as CAN signal through a CAN board, into VDC/TCS/ABS control unit 4. In this embodiment, the brake fluid pressure system is a real brake system, and therefore, values of pressure sensor signals are inputted without modification. The wheel speeds, yaw rate, lateral acceleration and pressures are inputted as sensor signals into VDC/TCS/ABS control unit 4 at regular intervals of 1 ms. The steer angle is inputted into VDC/TCS/ABS control unit 4, as a sensor signal, at regular intervals of 10 ms. A warning lamp is provided to indicating whether the system is operating properly.

VDC/TCS/ABS control unit 4 is a real unit. VDC/TCS/ABS control unit 4 receives the sensor signals from input/output box 3, and controls VDC/TCS/ABS actuator 6.

Master cylinder 5, VDC/TCS/ABS actuator 6 and wheel cylinders 7-10 are real components constituting a real hydraulic brake system.

Wheel cylinder pressure sensors 13, 14, 15 and 16 are provided, respectively, on the upstream side of wheel cylinders 7, 8, 9 and 10, arranged to sense the respective wheel cylinder pressures, and connected to input/output box 3 to send pressure signals thereto.

Figure 3:
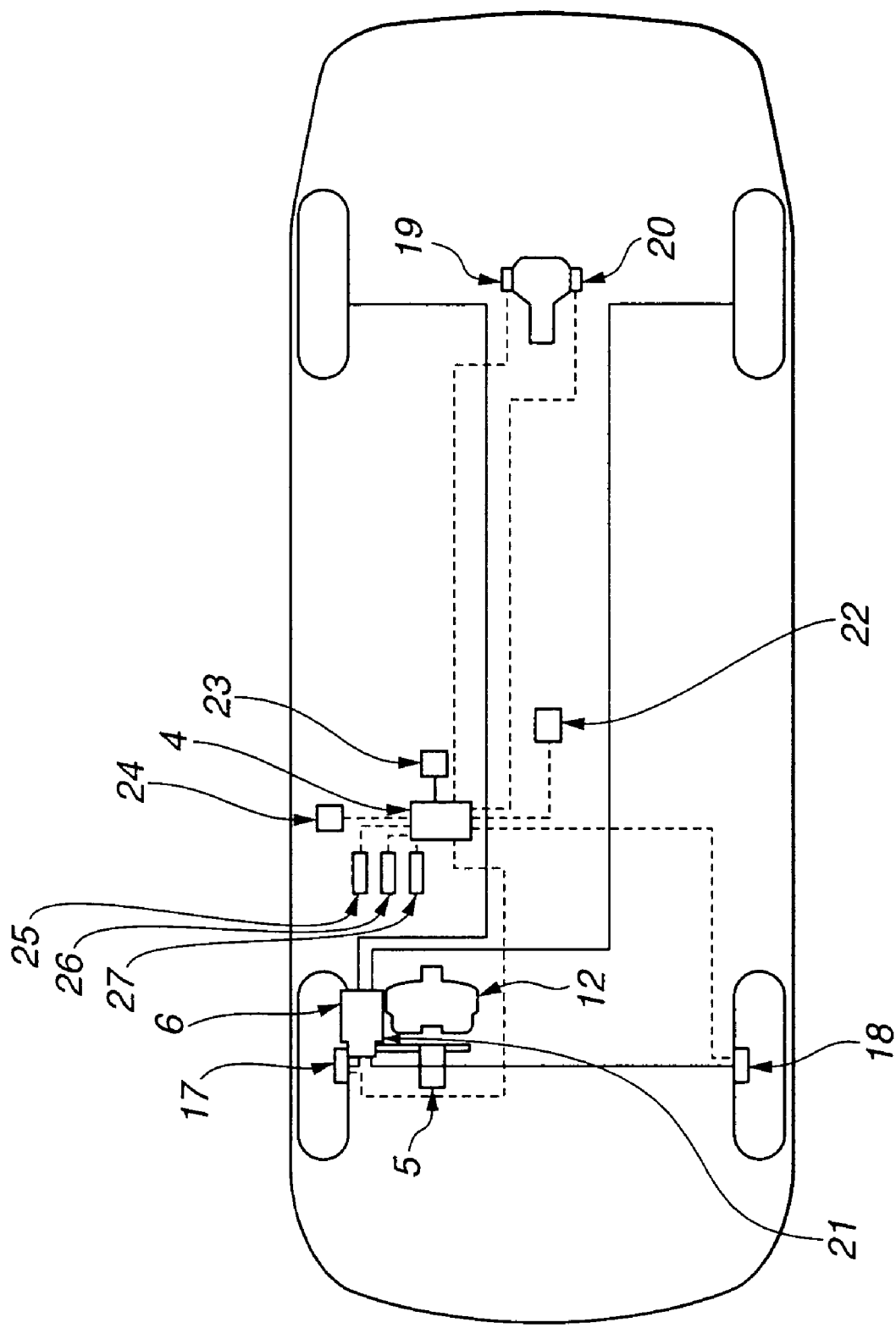
FIG. 3 is a schematic view showing the vehicle motion control system in a state in which the vehicle motion control system is installed in a real vehicle.

FIG. 3 shows the VDC/TCS/ABS control system installed in a real vehicle. The VDC/TCS/ABS control system includes VDC/TCS/ABS control unit 4; master cylinder 5; VDC/TCS/ABS actuator 6; booster 12; four wheel rotation sensors 17, 18, 19 and 20, respectively, for the front right, front left, rear right and rear left wheels of the vehicle; a pressure sensor 21; a yaw rate/lateral acceleration sensor 22; a steering angle sensor 23; a VDC off switch 24; a VDC off indicator lamp 25; a slip indicator lamp 26; and an ABS warning lamp 27.

Figure 4:
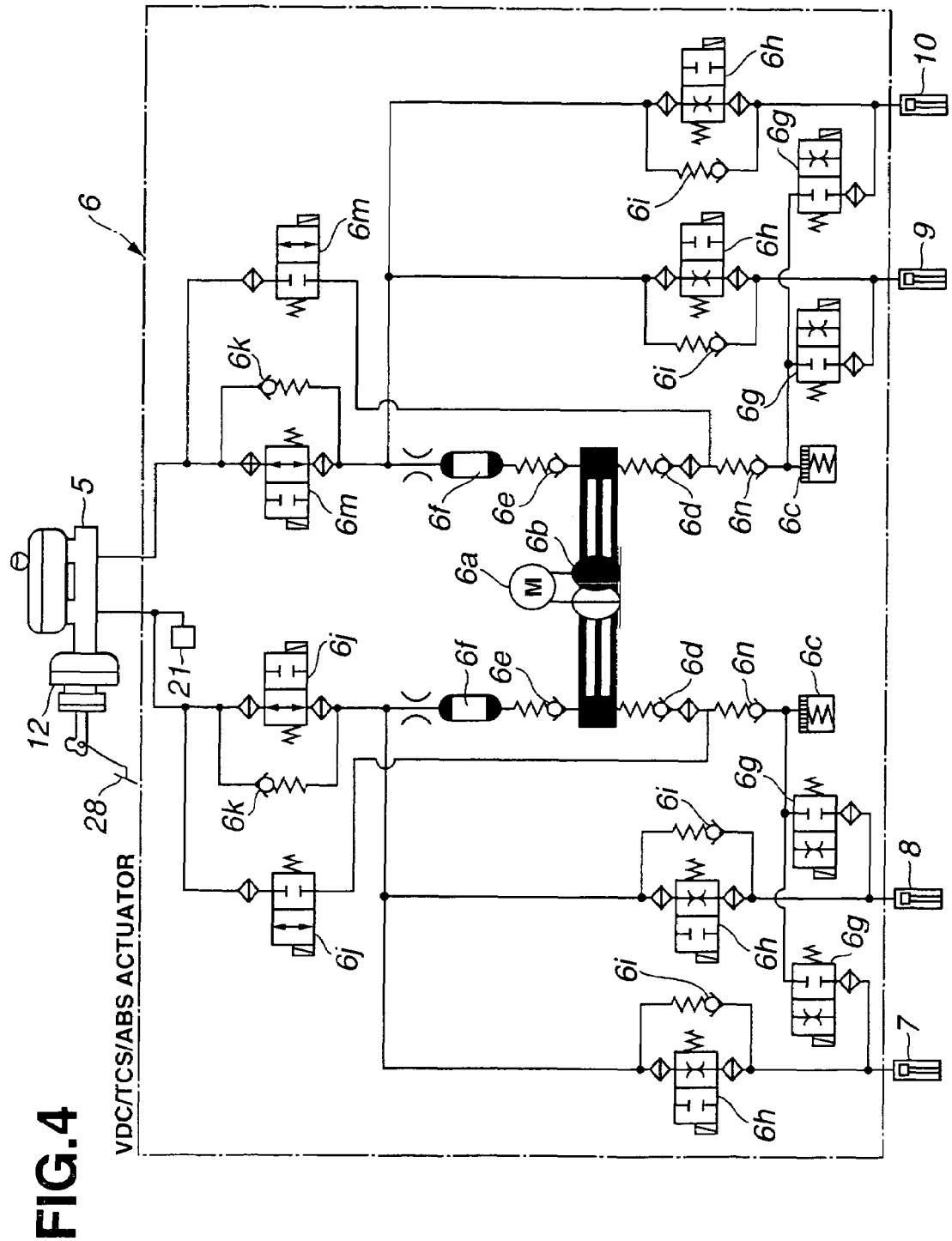
FIG. 4 is a view showing a hydraulic brake system of the vehicle motion control system installed in the real vehicle.

FIG. 4 shows the hydraulic brake system of the VDC/TCS/ABS control system of FIG. 3. The brake system includes a brake pedal 28; booster 12; master cylinder 5; VDC/TCS/ABS actuator 6; and four wheel cylinders 7, 8, 9 and 10, respectively, for the front left, front right, rear left and rear right wheels. As shown in FIG. 4, VDC/TCS/ABS actuator (or modulator) 6 is connected between master cylinder 5 and each of wheel cylinders 7-10. VDC/TCS/ABS actuator 6 includes one motor 6a; one pump 6b; two reservoirs 6c (front and rear); two inlet valves 6d; two outlet valves 6e; two dampers (or damper chambers) 6f; four outlet solenoid valves 6g; four inlet solenoid valves 6h; four return check valves 6i; two front VDC switching valve 6j; two check valves 6k; two rear VDC switching valves 6m; and two check valves 6n.

VDC/TCS/ABS actuator 6 is operated to switch solenoid valves 6g, 6h, 6j and 6m in response to control signals from VDC/TCS/ABS control unit 4, and thereby to control the fluid pressure of each wheel cylinder 7, 8, 9 or 10. With VDC/TCS/ABS actuator 6, the VDC/TCS/ABS control unit 4 controls the brake fluid pressure of each wheel cylinder in one of a normal brake mode, a pressure hold mode, a pressure decrease mode and a pressure increase mode.

Figure 5:
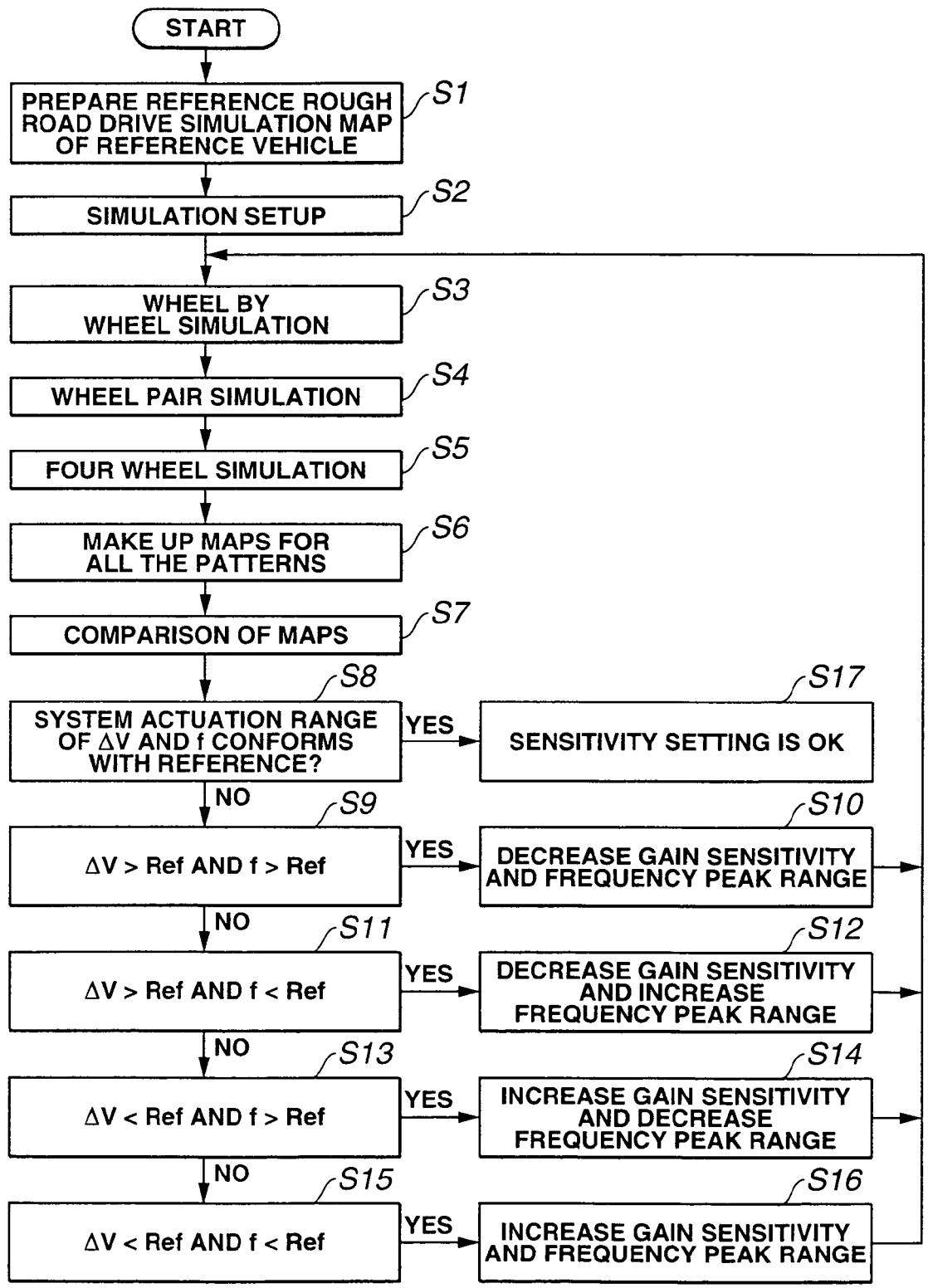
FIG. 5 is a flowchart showing a rough road drive simulation and evaluation process performed by the simulation system of FIG. 1.

FIG. 5 shows a rough road drive simulation and actuation sensitivity evaluation process for the vehicle control system (VDC/TCS/ABS control system in this embodiment). The process of FIG. 5 is performed by a test system which, in this example, is mainly composed of personal computer 1 and real-time simulator 2.

At step S1, the test system prepares a reference rough road drive simulation map for a reference vehicle used as a reference in the actuation sensitivity evaluation. After S1, the test system proceeds to step S2.

At step S2, the test system performs a simulation setup operation for setting the virtual vehicle model and connecting VDC/TCS/ABS control unit 4. After S2, the test system proceeds to step S3.

At step S3, the test system performs a simulation of each of the four wheels one by one at each of vehicle speed levels (0, 20, 40, 60, 80, 100, 120, 150 and 200 km/h, in this example) by using, as parameters, a wheel speed variation width $\Delta V$ and a wheel speed variation rate f. After the wheel-by-wheel simulation of S3 at the vehicle speed levels, the test system proceeds to step S4.

At step S4, the test system performs a simulation of each of the right and left front wheel pair and the right and left rear wheel pair at each of the vehicle speed levels. After the pair-by-pair simulation of S4 at the vehicle speed levels, the test system proceeds to step S5.

At step S5, the test system performs a simulation of the four wheels at each of the vehicle speed levels. After the all wheel simulation of S5 at the vehicle speed levels, the test system proceeds to step S6.

At step S6, the test system makes up input data maps of all the patterns of the wheel-by-wheel simulations of the respective vehicle speed levels, the pair-by-pair simulations of the respective vehicle speed levels and the all-wheel simulations of the respective vehicle speed levels. After S6, the test system proceeds to step S7.

At step S7, the test system compares each of the input data maps obtained as the results of the simulations, with the reference map prepared at step S1, in actuation range. After S7, the test system proceeds to step S8.

At step S8, the test system examines whether the actuation range (of the wheel speed variation width $\Delta V$ and the wheel speed variation rate f) is in agreement with the actuation range of the reference map. If it is, the test system proceeds to step 517. If it is not, the test system proceeds to step S9.

At step S9, according to the judgment that the system's actuation range is not in agreement with the actuation range of the reference map, the test system examines whether the wheel speed variation width $\Delta V$ is greater than a reference value for $\Delta V$ ($\Delta V$>Ref), and at the same time the wheel speed variation rate f is greater than a reference value for f (f>Ref). From S9, the test system proceeds to step S10 if it is; and to step S1 if it is not.

At step S10, according to the judgment at S9 that the wheel speed variation width $\Delta V$ is greater than the reference value ($\Delta V$>Ref), and at the same time the wheel speed variation rate f is greater than the reference value (f>Ref) (that is, a gain sensitivity is too high and a frequency sensitivity is too high), the test system decreases a gain sensitivity and a frequency peak range (corresponding to a gain and a cutoff frequency in the case of a filter). From S10, the test system returns to step S3. Thus, the test system performs the simulations again with the adjusted gain sensitivity and the adjusted frequency peak range, and evaluates the performance of the control system under test again by comparison of the maps.

At step S11, according to the judgment of S9 that at least one of the first condition ($\Delta V$>Ref) and the second condition (f>Ref) is not satisfied, the test system examines whether the wheel speed variation width is greater than the reference value ($\Delta V$>Ref) and at the same time the wheel speed variation rate f is smaller than the reference value (f<Ref). From S11, the test system proceeds to step S12 in the case of YES, and to a step S13 in the case of NO.

At step S12, according to the judgment of S11 that the gain sensitivity is too high and the frequency sensitivity is too low, the test system decreases the gain sensitivity and increases the frequency peak range, and then returns to step S3 to repeat the simulation with the adjusted gain sensitivity and the adjusted frequency peak range and the evaluation by map comparison.

At step S13, according to the judgment of S11 that at least one of the first condition ($\Delta V$>Ref) and the second condition (f<Ref) is not satisfied, the test system examines whether the wheel speed variation width is smaller than the reference value ($\Delta V$<Ref) and at the same time the wheel speed variation rate f is greater than the reference value (f>Ref). From S13, the test system proceeds to step S14 in the case of YES, and to a step S15 in the case of NO.

At step S14, according to the judgment at S13 that the gain sensitivity is too low and the frequency sensitivity is too high, the test system increases the gain sensitivity and decreases the frequency peak range, and then returns to step S3 to repeat the simulation with the adjusted gain sensitivity and the adjusted frequency peak range and the evaluation by map comparison.

At step S15, according to the judgment at S13 that at least one of the first condition ($\Delta V$<Ref) and the second condition (f>Ref) is not satisfied, the test system judges that the wheel speed variation width $\Delta V$ is smaller than the reference value ($\Delta V$<Ref) and at the same time the wheel speed variation rate f is smaller than the reference value (f<Ref). Therefore, the test system considers that the gain sensitivity is too low, and at the same time the frequency sensitivity is too low, and proceeds from S15 to step S16.

At step S16, according to the judgment that the gain sensitivity is too low and the frequency sensitivity is too low, the test system increases the gain sensitivity and the frequency peak range, and then returns to step S3 to repeat the simulation with the adjusted gain sensitivity and the adjusted frequency peak range and the evaluation by map comparison.

At step S17, according to the judgment of S8 that the system's actuation range (wheel speed variation width $\Delta V$ and wheel speed variation rate f) is in agreement with the actuation range of the reference map, the test system concludes that proper matching is attained between the reference map and simulation map by the adjustment of the gain sensitivity and the frequency peak range of the vehicle control system, and terminates the actuation sensitivity evaluating process. If the simulation with the initial values of the gain sensitivity and frequency peak range of the vehicle control system results in the conclusion that the system's actuation range is in agreement with the reference map, then the test system proceeds from S8 to S17 immediately without adjustment.

When a vehicle runs on a rough road such as a step, a gravel road or an irregular road, the rotating conditions of wheels are influenced by the road surface irregularities. This could cause malfunction of a vehicle control system (such as ABS, TCS, VDC, 4WD) arranged to sense a wheel's rotating condition, to estimate a vehicle running speed (vehicle body speed), and to start a control operation in accordance with a difference between the vehicle running speed and the wheel speed, because the variation of the wheel rotating condition affects the vehicle running speed recognized by the control system and the sensed wheel speed.

In the case of ABS, for example, the control system estimates the vehicle speed from wheel speeds sensed by wheel speed sensors, and starts the ABS control when the difference between the estimated vehicle speed and one of the wheel speeds exceeds a predetermined threshold value for judging a brake slipping state. Therefore, if a tire runs on a bump of a road surface and a sensed wheel speed becomes low, or if a tire jumps and spins swiftly and a wheel speed becomes high, the control system might start the ABS control erroneously in a situation not needing ABS. If the system's actuation sensitivity is decreased or dulled by increasing the threshold for the difference between the estimated vehicle speed and the wheel speed, then the control system could avoid such an erroneous actuation of ABS control, but might delay in starting ABS control in a situation requiring responsive ABS control, such as hard braking or braking on a low mu road surface. Therefore, accurate adjustment of the system actuation sensitivity (=allowable variation width) is important for the prevention of erroneous start of ABS on a rough road, and the attainment of proper responsiveness of ABS in case of hard braking and braking on a slippery road.

In the case of TCS, the control system starts the TCS control when the difference between the estimated vehicle speed and a sensed drive wheel speed exceeds a predetermined threshold value for judging a drive wheel slipping state. Therefore, accurate adjustment of the system actuation sensitivity is important for the prevention of erroneous start of TCS on a rough road, and the attainment of proper responsiveness of TCS in starting or acceleration.

The system actuation sensitivity can be optimized to prevent erroneous actuation of the control system on a rough road by a real vehicle running test using a real vehicle equipped with a control system to be tested. However, the real testing with an actual vehicle requires a great deal of work for verification, and prolongs the development time of a vehicle because the real testing is unfeasible until the completion of the vehicle under development.

Real-time simulation is technique capable of performing optimization and verification. Results of simulation obtained by computation are fed to a real ECU (engine control unit) as an input, and the output of the ECU is evaluated in a time scale of driving performance of a real vehicle.

However, in the case of a large simulation model, the limit of computing speed tends to disable computation on a real-time scale. The size of a simulation model becomes greater as the system, running state and environment become complicated, the number of required computation elements increases, and the number of parameters required for system optimization and verification increases. In real-time simulation, compression and substitution of element models is key technology.

However, a vehicle model including components such as engine, transmission, transfer and suspension is very important for building and evaluating a vehicle control system, so that a size reduction of a vehicle model is inadequate. It is difficult heretofore to achieve a rough road drive simulation and accurate evaluation of a system without reducing the size of a vehicle model.

The simulation system according to this embodiment of the present invention applies a road surface disturbance input based on correlation between the road surface disturbance and the wheel rotation variation (or fluctuation), to the vehicle model, and thereby creates a rough road driving situation, to attain both the accurate rough road driving simulation and the real-time simulating computation.

Figure 6:
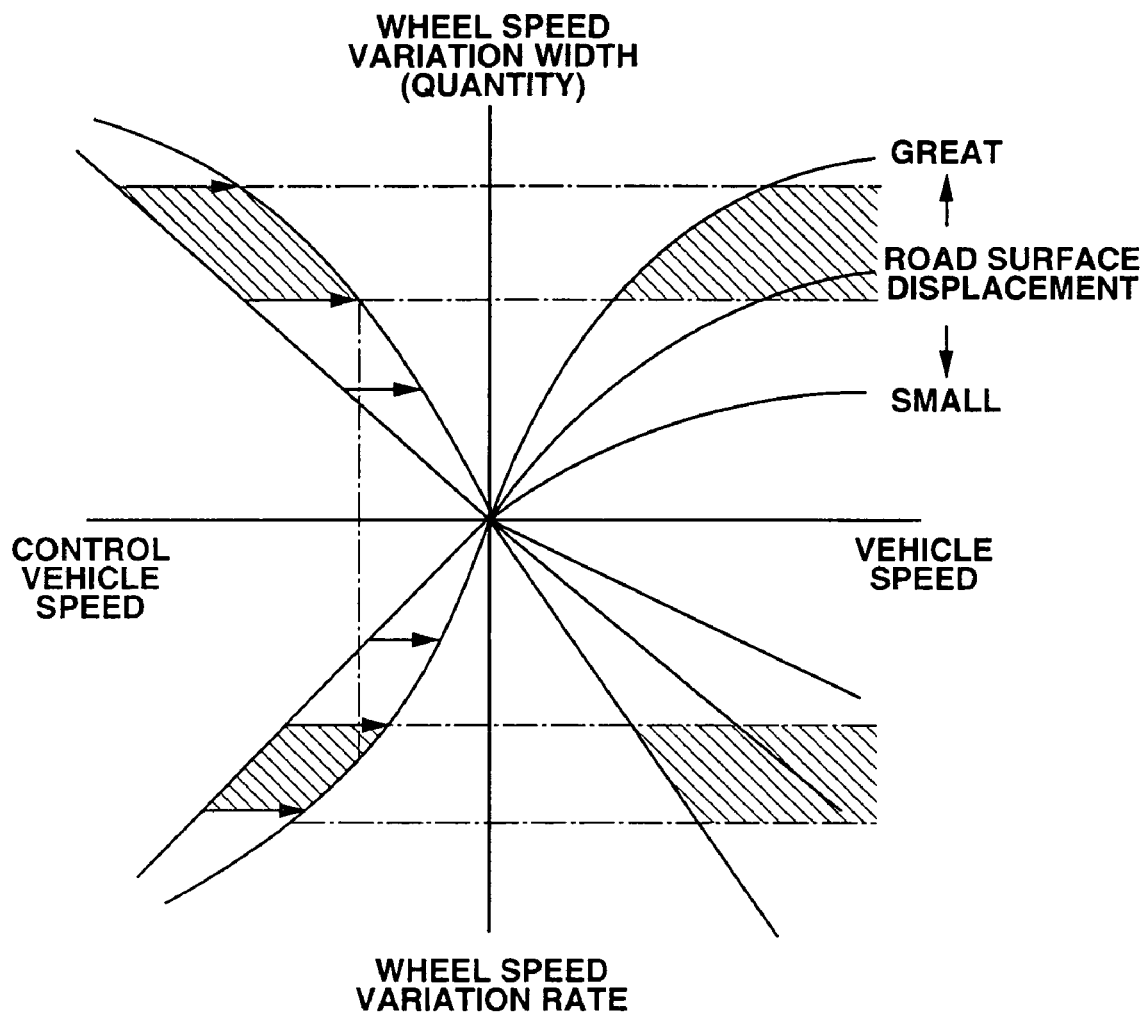
FIG. 6 is a characteristic view showing a correlation of road surface disturbance-wheel rotation variation-system actuation sensitivity, to illustrate a concept of simulation input in the embodiment of the present invention.

FIG. 6 is a view for illustrating the concept of simulation input according to the embodiment of the present invention. According to the following notion, the rough road simulating system of the embodiment sets a simulation input to assess the actuation sensitivity by using the correlation of road surface disturbance-wheel rotation variation-system actuation sensitivity; performs a virtual test driving by using the simulation input; and determines the system actuation sensitivity by examining a system actuation range in simulation results.

In FIG. 6, the first quadrant shows a correlation between a wheel speed variation width (quantity) with respect to a vehicle speed at each of various levels of a road surface displacement. A hatched region is a region in which the system would respond. The second quadrant shows a correlation between the wheel speed recognized by the system through various filters with the wheel speed variation width, and the actual vehicle speed. There is a hatched region in which the difference between the two speeds becomes greater than or equal to a predetermined value and the system is actuated. This hatched region is replaced by the hatched region in the first quadrant, and the correlation between the road surface raising and depressing quantity (or span) and the system actuation range is attained.

The fourth quadrant shows a correlation of the wheel speed variation rate (or variation speed) at different values of road surface input interval with respect to the vehicle speed. A hatched region is a region in which the system would respond. The third quadrant shows a correlation between the wheel speed recognized by the system through various filters with the wheel speed variation rate, and the actual vehicle speed. There is a hatched region in which the difference between the two speeds becomes greater than or equal to a predetermined value and the system is actuated, as in the second quadrant. This hatched region is replaced by the hatched region in the fourth quadrant, and the correlation between the road surface raising and depressing quantity and the system actuation range is attained.

From the concept shown in FIG. 6, to determine a relation between a possible road surface disturbance input and a system actuation sensitivity responsive to the road surface disturbance input, the input in the hatched regions is simulated. At each of the vehicle running speed levels, the simulation system superimposes, as a noise, a noise signal determined by the wheel speed variation quantity (first road noise parameter) and the wheel speed variation rate (second road noise parameter), onto the wheel rotation signal, and thereby simulates the rough road driving state. Moreover, the simulation condition is changed to represent the situation in which only one wheel undergoes a wheel speed variation, the situation in which two wheels undergo a wheel speed variation simultaneously, and the situation in which the four wheels undergo a wheel speed variation. By so doing, the simulation system can estimate the function of calculating the sensed actual vehicle running speed by performing the simulation with various combinations of the wheels to which the noise is superimposed.

Figure 7:
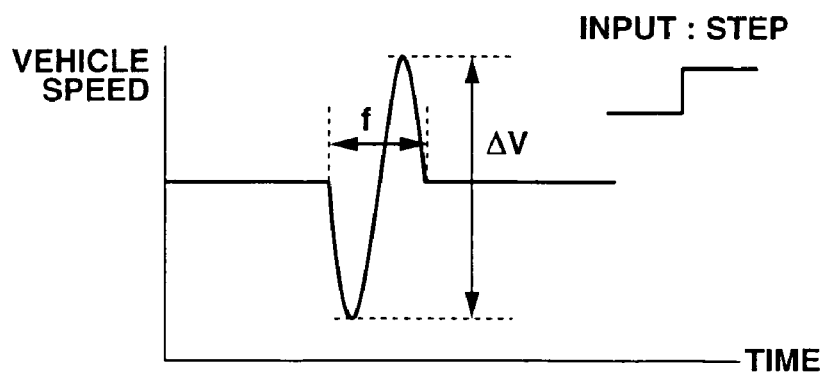
FIG. 7 is a graph illustrating parameters used in the embodiment, for determining a waveform of a road disturbance noise representing a form of a rough road.

FIGS. 7 and 8 show a concrete example of the noise to be superimposed on the wheel rotation signal. As shown in FIG. 7, a road surface disturbance input to be applied to one or more wheels of the virtual vehicle model in the real-time simulator has an input noise waveform having, as parameters, the wheel speed variation width $\Delta V$ and the wheel speed variation rate f (input frequency). In the road noise input waveform example shown in FIG. 8, $\Delta V=4$ km/h(P-P), and f=12 Hz. In preparing input data maps, the parameters are denoted as $\Delta V \rightarrow$ frequency (provided that computation is performed by using a tire dynamic radius of MF (Magic Formula); and f$\rightarrow$period (time). Though the concept of the wheel speed variation is fundamentally based on the vehicle speed (frequency: 20, 50, 100, 200, 1000, 2000 Hz), the variation is set with realistic vehicle speed levels from the road surface forms. The input frequency is set at realistic levels from the current MF data (various Z direction road surfaces).

In this embodiment, a wheel disturbance input to be applied to the virtual vehicle model of real-time simulator 2 is prepared in various forms representing various road surface irregularities. In the illustrated example, wheel disturbance input forms different in continuity of the road disturbance noise waveform are prepared by using an input data map as shown in FIG. 9 in which each cell is determined by a value of the wheel speed variation width varying from a value corresponding to a single input to a value corresponding to a continuous input (random) along a vertical axis, and a value of the wheel speed variation rate varying from a value corresponding to a single input to a value corresponding to a continuous input (resonance) along a horizontal axis. In FIG. 9, an ellipse indicates a realistic range.

FIG. 10 shows road disturbance input forms classified according to the continuity of input noise waveform into (1) single input, (2) continuous input, and (3) discontinuous input. The category (1) of the single input includes a step (raised portion), a bump, a recess, a manhole, and a rutted road. The forms are shown in side view in a right column of FIG. 10. The category (2) of the continuous input is an irregular road surface including a corrugated road, a cobbled road and a gravel road. The category (3) of the discontinuous input includes a road surface including irregular regions and smooth regions arranged alternately.

FIG. 11 shows various driving situations (or driving scenes) including (1) a one-sided input state in which one wheel undergoes wheel speed variation; (2) a both-sided input state in which two wheels undergo wheel speed variation simultaneously; (3) a front and rear phase difference input state (such as a raised portion) in which a road surface disturbance is first inputted to one wheel and then inputted to another wheel. Moreover, all the four wheels undergo wheel speed variation simultaneously or with phase difference when a vehicle runs on an irregular road such as gravel road.

In the rough road simulation, the simulation system proceeds in a flow of S1→S2→S3→S4→S5→S6, and produces input data maps of all the road disturbance noise patterns in the one side (one wheel) input situation at the different vehicle speed levels, in the both side (two wheel) input situation at the different vehicle speed levels, and in the four wheel input situation at the different vehicle speed levels.

FIG. 12B shows, as an example, a real-time simulation data map obtained as a result of real-time simulation at each of vehicle speed levels (A, B, C, D, E and F) of the vehicle speed before a wheel speed is varied. The simulation system estimates or assesses a system actuation sensitivity by using the simulation data map.

The input data map includes a collection of data items each determined by one value of the wheel speed variation width $\Delta V$ expressed along a horizontal axis, and one value of the wheel speed variation rate f expressed along a vertical axis. Correlation with the system actuation sensitivity is as follows, for example. When the variation width is great and the frequency is low; then a sensitivity to a great amplitude input with a low frequency is obtained as in a situation in which a vehicle runs over a great step. When the variation width is small and the frequency is high; then a sensitivity on a continuous rough road is obtained as in a situation in which a vehicle runs over a gravel road at a high speed.

Basically, the system sensitivity is similar, in conceptual framework, to a low-pass filter. A low frequency noise is allowed to pass if a gain is large, and a noise having a band having a frequency peak is allowed to pass even if a gain is small, so that the system tends to be actuated by receiving such a noise. However, the filtering in the system is not a simple filter, but a more complex system in which filters are changed over or parameters are changed in accordance with a sensed vehicle operating condition. Accordingly, the simulation system according to the embodiment is arranged to apply a road surface disturbance input to one or more wheels in various combinations, in various patterns, and to estimate the influence of the noise (including the system sensitivity) accurately and efficiently, by comparison with a reference simulation map which is prepared on the basis of results of real vehicle testing (so that a frequency band in which the system is actuated and an adjustment quantity of a gain are determined and verified).

When the system actuation sensitivity is set at an adequate condition (by initial setting or by adjustment), the simulation system follows a control flow of S6→S7→S8→S17, and concludes at S17 that the setting is adequate and acceptable.

When $\Delta V$>Ref and f>Ref; the control flow is S6→S7→S8→S9→S10. At S10, the simulation system decreases the gain sensitivity and the frequency peak range, then returns to S3 and repeats the evaluation until the answer of S8 becomes affirmative. When the system actuation range is conformable with the desired reference actuation range of the reference map, then the simulation system proceeds from S8 to S17 and concludes the sensitivity adjustment with the judgment that the setting is acceptable. In the example of the simulation result data map shown in FIG. 12B, the gain sensitivity and the frequency sensitivity are high as compared to the map of the reference vehicle shown in FIG. 12A, and therefore the simulation system adjusts the system actuation range (indicated by X) as shown by an arrow in FIG. 12B, by decreasing the gain sensitivity and the frequency peak range. In FIGS. 12A and 12B, a mark of a circle indicates non-actuation, and a mark of X indicates actuation).

When ΔV>Ref and f<Ref, the control flow is S6→S7→S8→S9→S11→S12. At S12, the simulation system decreases the gain sensitivity and increases the frequency peak range, then returns to S3 and repeats the evaluation until the answer of S8 becomes affirmative. When the system actuation range is conformable with the desired reference actuation range of the reference map, then the simulation system proceeds from S8 to S17 and concludes the sensitivity adjustment with the judgment that the setting is acceptable.

When ΔV<Ref and f>Ref, the control flow is S6→S7→S8→S9→S11→S13→S14. At S14, the simulation system increases the gain sensitivity and decreases the frequency peak range, then returns to S3 and repeats the evaluation until the answer of S8 becomes affirmative. When the system actuation range is conformable with the desired reference actuation range of the reference map, then the simulation system proceeds from S8 to S17 and concludes the sensitivity adjustment with the judgment that the setting is acceptable.

When ΔV<Ref and f<Ref, the control flow is S6→S7→S8→S9→S11→S13→S15→S16. At S16, the simulation system increases the gain sensitivity and the frequency peak range, then returns to S3 and repeats the evaluation until the answer of S8 becomes affirmative. When the system actuation range is conformable with the desired reference actuation range of the reference map, then the simulation system proceeds from S8 to S17 and concludes the sensitivity adjustment with the judgment that the setting is acceptable.

The thus-constructed rough road drive simulation system according to the embodiment of the invention can achieve both of the accurate simulation of a rough road driving and the real-time computation. By superimposing a noise signal representing a pattern of road surface irregularities on a wheel rotation speed signal, the rough road drive simulation system according to the embodiment can perform a virtual rough road driving test without using a road environment model.

In the illustrated embodiment, the reference simulation data is prepared in advance. However, it is optional to determine reference simulation data by performing simulation of a VDC/TCS/ABS control system whose performance is already verified, in a model of an existing vehicle.

This application is based on a prior Japanese Patent Application No. 2004-158212 filed on May 27, 2004. The entire contents of this Japanese Patent Application No. 2004-158212 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rough road drive simulation apparatus for testing a vehicle motion control system, the simulation apparatus comprising:
a real-time simulator configured to simulate a rough road driving state by entering, into a vehicle model representing a vehicle equipped with the vehicle motion control system, a wheel disturbance input based on a correlation between a road surface disturbance and a wheel rotation variation,
wherein the wheel disturbance input is in a form of a noise superimposed on a wheel speed signal inputted into the vehicle model,
wherein the wheel disturbance input is inputted into the vehicle model in a plurality of disturbance input patterns different in continuity of a waveform of the noise, the disturbance input patterns including a single input pattern and a continuous input pattern.

2. The rough road drive simulation apparatus as claimed in claim 1, wherein the rough road drive simulation apparatus further comprises an estimator to estimate a system actuation sensitivity of the vehicle motion control system by comparing real-time simulation data obtained by simulation of the real-time simulator, with reference simulation data.

3. A rough road drive simulation apparatus for testing a vehicle motion control system, the simulation apparatus comprising:
a real-time simulator configured to simulate a rough road driving state by entering, into a vehicle model representing a vehicle equipped with the vehicle motion control system, a wheel disturbance input based on a correlation between a road surface disturbance and a wheel rotation variation,
wherein the wheel disturbance input is in a form of a noise superimposed on a wheel speed signal inputted into the vehicle model,
wherein the noise is determined by using, as a parameter, a wheel speed variation width and a wheel speed variation rate.

4. The rough road drive simulation apparatus as claimed in claim 3, wherein the wheel disturbance input is inputted into the vehicle model in a plurality of different forms representing different road surface irregular conditions by using an input data map set with the wheel speed variation width along one of vertical and horizontal axes, and the wheel speed variation rate along the other of the vertical and horizontal axes.

5. The rough road drive simulation apparatus as claimed in claim 3, wherein the rough road drive simulation apparatus further comprises an estimator to estimate a system actuation sensitivity of the vehicle motion control system by comparing real-time simulation data obtained by simulation of the real-time simulator, with reference simulation data.

6. A rough road drive simulation apparatus for testing a vehicle motion control system, the simulation apparatus comprising:
a real-time simulator configured to simulate a rough road driving state by entering, into a vehicle model representing a vehicle equipped with the vehicle motion control system, a wheel disturbance input based on a correlation between a road surface disturbance and a wheel rotation variation, and
an estimator to estimate a system actuation sensitivity of the vehicle motion control system by comparing real-time simulation data obtained by simulation of the real-time simulator, with reference simulation data,
wherein the real-time simulator is configured to perform simulation in each of disturbance patterns representing different rough road patterns; and the estimator is configured to accumulate the real-time simulation data in a form of a real-time simulator data map by entering data on actuation or non-actuation of the vehicle motion control system in the real-time simulation data map; and to estimate the system actuation sensitivity by comparing the real-time simulation data map with the reference simulation data in a form of a reference data map.

7. The rough road drive simulation apparatus as claimed in claim 6, wherein the real-time simulator is configured to perform simulation in each of the disturbance patterns at each of various vehicle speed levels.

8. The rough road drive simulation apparatus as claimed in claim 6, wherein the estimator is configured to check consistency between a system actuation range of the real-time simulation data map and a system actuation range of the reference data map, and to adjust the actuation sensitivity of the vehicle motion control system so as to increase the consistency.

9. A rough road drive simulation apparatus for testing a vehicle motion control system, the simulation apparatus comprising:
   a virtual test driving section adapted to be connected with the vehicle motion control system and configured to test a response of the vehicle motion control system in a simulated driving environment of a virtual vehicle model, by inputting a wheel speed signal into the vehicle motion control system in the virtual vehicle model,
   the virtual test driving section being further configured: to simulate a driving state of the virtual vehicle model on a rough road by inputting, into the vehicle motion control system, a noise-superimposed wheel speed signal obtained by superimposing a road disturbance noise onto the wheel speed signal; to examine a response of the vehicle motion control system to the noise-superimposed wheel speed signal; and to adjust a sensitivity parameter of the vehicle motion control system so as to adjust a sensitivity of the vehicle motion control system toward a desired reference.

10. The rough road drive simulation apparatus as claimed in claim 9, wherein the virtual test driving section is configured to produce a road disturbance noise signal in a plurality of different waveforms determined by a first road noise parameter representing an amplitude of a road surface disturbance and a second road noise parameter representing a frequency of the road surface disturbance; and to simulate the driving state of the virtual vehicle model by using each of the waveforms of the road disturbance noise signal.

11. The rough road drive simulation apparatus as claimed in claim 9, wherein the virtual test driving section is configured to simulate the driving state of the virtual vehicle model on a rough road, by inputting, into the vehicle motion control system, a first noise-superimposed wheel speed signal obtained by superimposing a first road disturbance noise onto a first wheel speed signal representing a wheel speed of a first wheel of the virtual vehicle, and a second noise-superimposed wheel speed signal obtained by superimposing a second road disturbance noise onto a second wheel speed signal representing a wheel speed of a second wheel of the virtual vehicle.

12. A rough road drive simulation process for testing a vehicle motion control system, the simulation process comprising:
   setting the vehicle motion control system in a simulated virtual environment including a virtual vehicle model;
   inputting a noise-superimposed wheel speed signal produced by superimposing a road disturbance noise signal onto a wheel speed signal, into the vehicle motion control system in the simulated virtual environment;
   examining a response of the vehicle motion control system to the noise-superimposed wheel speed signal; and
   adjusting a control parameter of the vehicle motion control system so as to adjust the response of the vehicle motion control system to a desired reference.

13. The rough road drive simulation process as claimed in claim 12, wherein the simulation process further comprises:
   producing the road disturbance noise signal; and
   superimposing the road disturbance noise signal onto the wheel speed signal, and thereby producing the noise-superimposed wheel speed signal.

14. A rough road drive simulation apparatus for testing a vehicle motion control system, the simulation apparatus comprising:
   means for setting the vehicle motion control system in a simulated virtual environment including a virtual vehicle model;
   means for inputting a noise-superimposed wheel speed signal produced by superimposing a road disturbance noise signal onto a wheel speed signal, into the vehicle motion control system in the simulated virtual environment;
   means for examining a response of the vehicle motion control system to the noise-superimposed wheel speed signal; and
   means for adjusting a sensitivity of the vehicle motion control system so as to adjust the sensitivity of the vehicle motion control system to a desired reference value.

* * * * *